(12) United States Patent
Sakai et al.

(10) Patent No.: US 11,827,186 B2
(45) Date of Patent: Nov. 28, 2023

(54) VEHICLE CLEANING DEVICE, MANUFACTURING METHOD THEREOF, AND ASSEMBLY METHOD THEREOF

(71) Applicant: KOITO MANUFACTURING CO., LTD., Tokyo (JP)

(72) Inventors: Masaru Sakai, Shizuoka (JP); Yasuhiro Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 12 days.

(21) Appl. No.: 17/493,161

(22) Filed: Oct. 4, 2021

(65) Prior Publication Data

US 2022/0105903 A1 Apr. 7, 2022

(30) Foreign Application Priority Data

Oct. 7, 2020 (JP) .................. 2020-170158
Oct. 7, 2020 (JP) .................. 2020-170159

(51) Int. Cl.

| | |
|---|---|
| B60S 1/52 | (2006.01) |
| F04B 39/12 | (2006.01) |
| B08B 3/02 | (2006.01) |
| B05B 1/14 | (2006.01) |
| B05B 1/30 | (2006.01) |
| B60S 1/56 | (2006.01) |

(52) U.S. Cl.
CPC .................. *B60S 1/52* (2013.01); *B05B 1/14* (2013.01); *B05B 1/3006* (2013.01); *B08B 3/02* (2013.01); *F04B 39/121* (2013.01); *B60S 1/56* (2013.01)

(58) Field of Classification Search
CPC .................. B60S 1/52; B60S 1/528
See application file for complete search history.

(56) References Cited

U.S. PATENT DOCUMENTS

| | | | | |
|---|---|---|---|---|
| 5,605,286 A * | 2/1997 | Orth | .................. | B60S 1/528 239/570 |
| 5,762,271 A * | 6/1998 | Lind | .................. | B05B 15/74 239/570 |
| 11,535,200 B2 * | 12/2022 | Lomer | .................. | B60S 1/026 |

(Continued)

FOREIGN PATENT DOCUMENTS

| | | | | |
|---|---|---|---|---|
| DE | 19903424 A1 * | 8/2000 | .................. | B60S 1/48 |
| DE | 19904989 A1 * | 8/2000 | .................. | B60S 1/528 |

(Continued)

*Primary Examiner* — Michael E Barr
*Assistant Examiner* — Omair Chaudhri
(74) *Attorney, Agent, or Firm* — Sughrue Mion, PLLC

(57) ABSTRACT

A vehicle cleaning device includes a cylinder to which a cleaning fluid is supplied; a piston slidably inserted in the cylinder; a spray nozzle unit mounted at a leading end of the piston and configured to spray the cleaning fluid toward an object-to-be-cleaned; and a cap that closes a gap between the cylinder and the piston in an opening of the cylinder through which the piston protrudes. The cap includes a tubular part inside the cylinder, and the tubular part defines an end of movement of the piston. A communication hole is provided between a communication groove provided in an outer peripheral surface of the tubular part and an inner peripheral surface of the cylinder, and the gap between the cylinder and the piston communicates with the outside of the cylinder through the communication hole.

6 Claims, 10 Drawing Sheets

(56) References Cited

U.S. PATENT DOCUMENTS

| | | | | |
|---|---|---|---|---|
| 2003/0116645 A1* | 6/2003 | Hirose | ............... | B60S 1/528 |
| | | | | 239/284.2 |
| 2006/0114666 A1* | 6/2006 | Sakai | ............... | B60S 1/528 |
| | | | | 362/96 |
| 2006/0273139 A1* | 12/2006 | Sakai | ............... | B60S 1/528 |
| | | | | 228/101 |
| 2009/0014555 A1* | 1/2009 | Litvinov | ............ | B05B 1/3447 |
| | | | | 239/284.2 |
| 2016/0339875 A1* | 11/2016 | Ina | ............... | B60S 1/522 |
| 2022/0009453 A1* | 1/2022 | Rachow | ............... | B60R 11/00 |

FOREIGN PATENT DOCUMENTS

| | | | | | |
|---|---|---|---|---|---|
| EP | 0572147 | B1 | * | 4/1996 | |
| EP | 1180459 | A2 | * | 2/2002 | ............. B60S 1/528 |
| EP | 2511144 | A2 | * | 10/2012 | ............. B60S 1/528 |
| FR | 3005623 | A1 | * | 11/2014 | ............. B05B 15/10 |
| JP | H10119731 | A | * | 5/1998 | |
| JP | 2012-218705 | A | | 11/2012 | |
| KR | 20120081449 | A | * | 7/2012 | |

\* cited by examiner

16

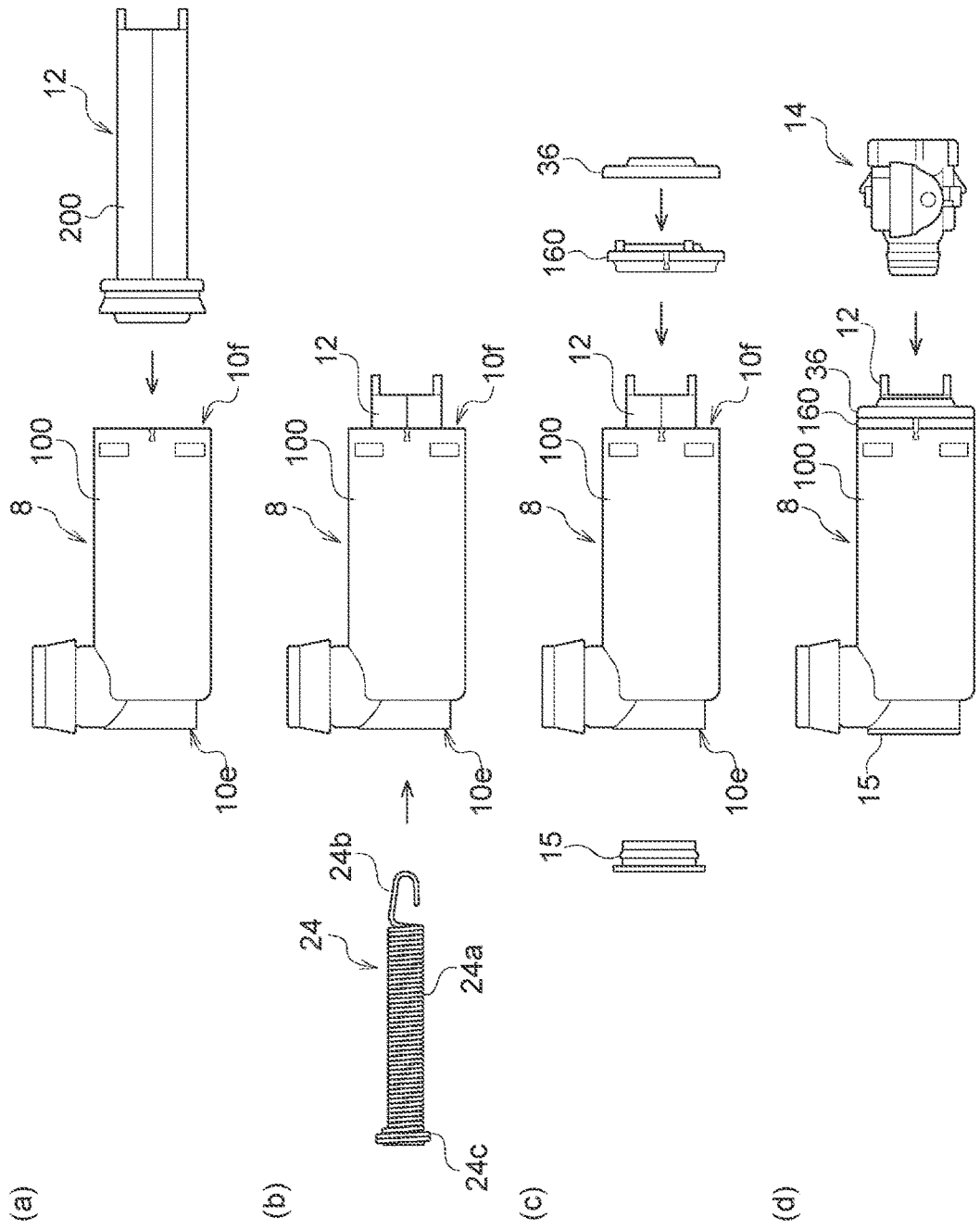

VEHICLE CLEANING DEVICE, MANUFACTURING METHOD THEREOF, AND ASSEMBLY METHOD THEREOF

CROSS-REFERENCE TO RELATED APPLICATION

This application claims priority to Japanese Patent Application No. 2020-170158 filed on Oct. 7, 2020 and Japanese Patent Application No. 2020-170159 filed on Oct. 7, 2020, each incorporated herein by reference in its entirety.

BACKGROUND

1. Technical Field

The disclosure relates to a vehicle cleaning device, a manufacturing method thereof, and an assembly method thereof.

2. Description of Related Art

There have been vehicle cleaning devices that clean an object-to-be-cleaned, for example, a vehicle lamp by protruding a spray nozzle unit through an opening formed in a vehicle body or a bumper to the outside and spraying a fluid from the spray nozzle unit.

SUMMARY

When a plurality of kinds of vehicle cleaning devices different from each other in the stroke length of the piston is produced with the use of the technique described in Japanese Unexamined Patent Application Publication No. 2012-218705, cylinders and pistons with different lengths need to be prepared for the respective kinds of vehicle cleaning devices. This increases the cost.

Since the housing space inside the vehicle body or behind the bumper is limited, it is desirable to reduce the overall length of the vehicle cleaning device in the moving direction of the spray nozzles.

The disclosure provides a technique that enables relatively low-cost production of a plurality of kinds of vehicle cleaning devices different from each other in the stroke length.

The disclosure reduces the overall length of a vehicle cleaning device.

A vehicle cleaning device according to a first aspect of the disclosure includes a cylinder to which a cleaning fluid is supplied; a piston that is slidably inserted in the cylinder; a spray nozzle unit that is mounted at a leading end of the piston protruding from the cylinder, the spray nozzle unit being configured to spray the cleaning fluid toward an object-to-be-cleaned; and a cap that closes a gap between the cylinder and the piston in an opening of the cylinder through which the piston protrudes. The cap includes a tubular part located inside the cylinder. The tubular part defines an end of movement of the piston in a direction in which the leading end of the piston moves away from the cylinder. A communication groove is provided in an outer peripheral surface of the tubular part. The communication hole is provided between the communication groove and an inner peripheral surface of the cylinder, and the gap between the cylinder and the piston communicates with an outside of the cylinder through the communication hole.

A second aspect of the disclosure relates to a manufacturing method of a vehicle cleaning device. The vehicle cleaning device includes a cylinder to which a cleaning fluid is supplied; a piston that is slidably inserted in the cylinder; a spray nozzle unit that is mounted at a leading end of the piston protruding from the cylinder, the spray nozzle unit being configured to spray the cleaning fluid toward an object-to-be-cleaned; and a cap that closes a gap between the cylinder and the piston in an opening of the cylinder through which the piston protrudes, the cap including a tubular part located inside the cylinder, the tubular part defining an end of movement of the piston in a direction in which the leading end of the piston moves away from the cylinder. The manufacturing method includes a formation step of forming members of the vehicle cleaning device; and an assembly step of assembling the vehicle cleaning device using the members. The formation step includes a cap formation step of forming the cap in which a length of the tubular part in a moving direction of the piston is determined based on a design value of a stroke length of the piston.

Any combination of the above-described constituent elements, and a method, a device, a system, etc that are obtained by interchanging the constituent elements and the expressions of the disclosure are also effective aspects of the disclosure.

According to the first and second aspects of the disclosure, it is possible to provide a technique that enables relatively low-cost production of a plurality of kinds of vehicle cleaning devices different from each other in the stroke length.

A vehicle cleaning device according to a third aspect of the disclosure includes a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body; a piston including a piston tube that is open at both ends, the piston tube being slidably inserted in the cylinder tube; and a spray nozzle unit that is mounted at a leading end, in an extension direction, of the piston tube protruding from the cylinder tube, the spray nozzle unit being configured to spray the cleaning fluid supplied through an inside of the piston tube toward an object-to-be-cleaned. The coupling part is joined to the outer periphery of the cylinder tube at a position on a side opposite from the spray nozzle unit. When the piston is in a retracted position and the coupling part is seen in a direction orthogonal to the extension direction, the piston tube and a flow passage for the cleaning fluid inside the coupling part overlap each other.

A vehicle cleaning device according to a fourth aspect of the disclosure includes a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body; a piston including a piston tube that is open at both ends, the piston being slidably inserted in the cylinder tube; a spray nozzle unit that is mounted at a leading end, in an extension direction, of the piston tube protruding from the cylinder tube, the spray nozzle unit being configured to spray the cleaning fluid supplied through an inside of the piston tube toward an object-to-be-cleaned; and a spring that is housed inside the piston tube and urges the piston toward a side opposite from the spray nozzle unit. The coupling part is joined to the outer periphery of the cylinder tube at a position on the side opposite from the spray nozzle unit. The cylinder tube has, at an end on the side opposite from the spray nozzle unit, an opening through which the spring is inserted during assembly of the vehicle cleaning device, and the opening is closed with a cap. An end of the spring on the side opposite from the spray nozzle unit is located farther from the spray nozzle unit than the inflow port is.

A fifth aspect of the disclosure relates to an assembly method of a vehicle cleaning device. The vehicle cleaning device includes a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body; a piston including a piston tube that is open at both ends, the piston tube being slidably inserted in the cylinder tube; and a spray nozzle unit that is mounted at a leading end, in an extension direction, of the piston tube protruding from the cylinder tube, the spray nozzle unit being configured to spray the cleaning fluid supplied through an inside of the piston tube toward an object-to-be-cleaned, the coupling part being joined to the outer periphery of the cylinder tube at a position on a side opposite from the spray nozzle unit. The assembly method comprising the steps of inserting a spring into the piston tube inside the cylinder tube through an opening provided at an end of the cylinder tube on the side opposite from the spray nozzle unit, fixing a part of the spring on a side of the spray nozzle unit to the piston tube, and fixing a part of the spring on the side opposite from the spray nozzle unit to the cylinder tube such that an end of the spring on the side opposite from the spray nozzle unit is located farther from the spray nozzle unit than the inflow port is; and closing the opening with a cap.

Any combination of the above-described constituent elements, and a method, a device, a system, etc that are obtained by interchanging the constituent elements and the expressions of the disclosure are also effective aspects of the disclosure.

According to the third to fifth aspects of the disclosure, it is possible to reduce the overall length of the vehicle cleaning device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 6:
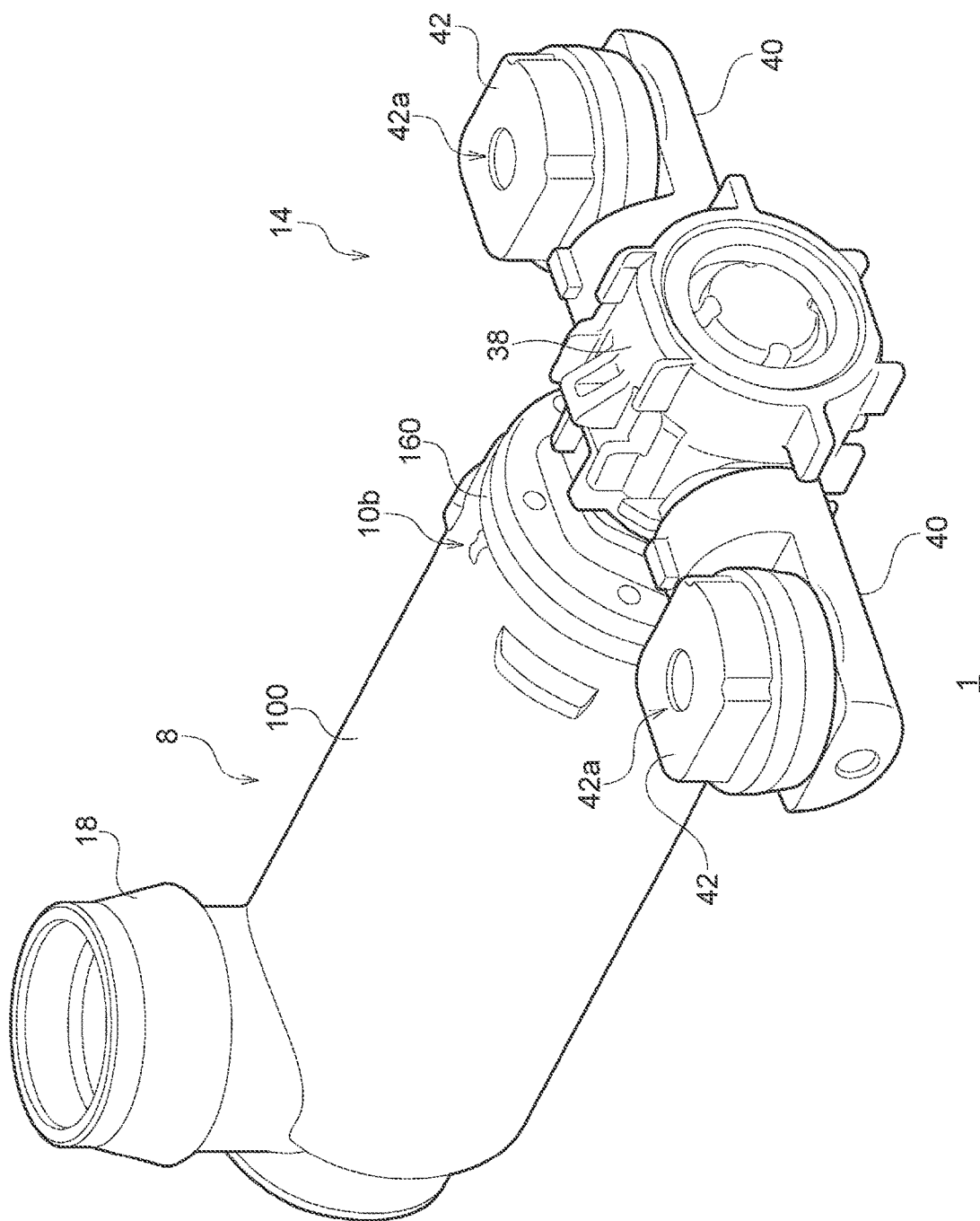
FIG. 6 is a perspective view of a vehicle cleaning device according to a second embodiment.
Figure 10A:
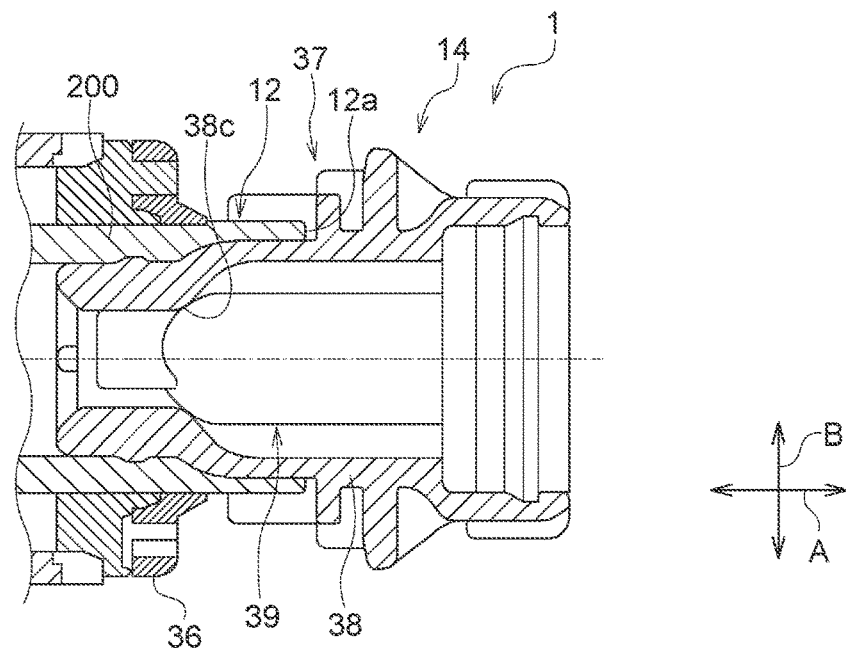
Figure 10B:
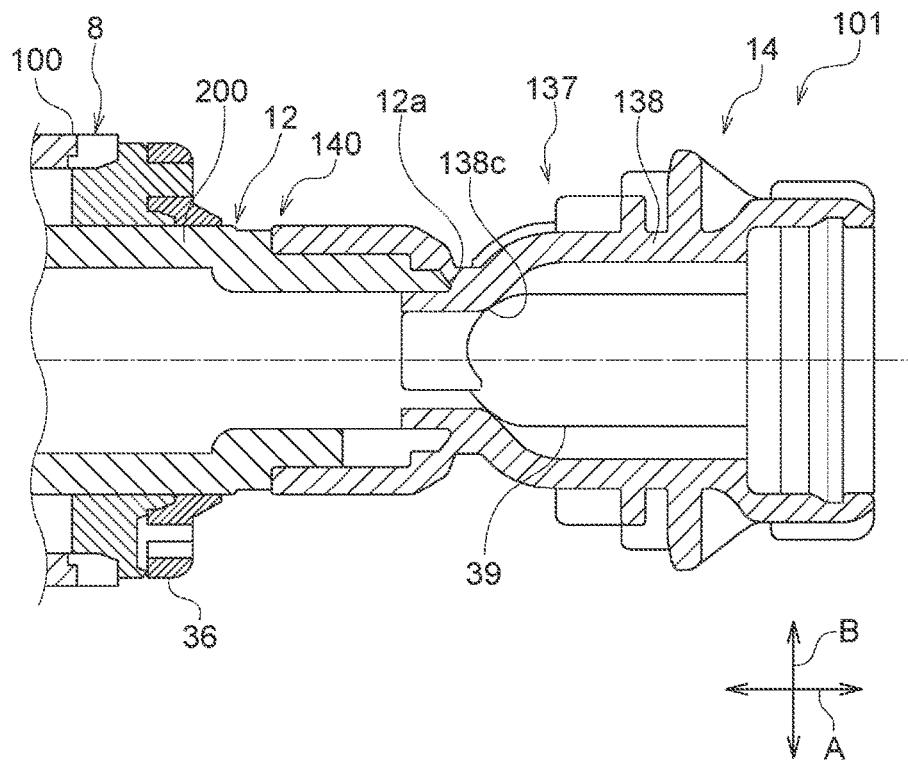

Portions (a) to (d) in FIG. 9 are views showing a procedure of assembling the vehicle cleaning device of FIG. 6;

FIG. 10A is a view for describing effects of the vehicle cleaning device of FIG. 6; and FIG. 10B is a view for describing the effects of the vehicle cleaning device of FIG. 6.

DETAILED DESCRIPTION OF EMBODIMENTS

The disclosure will be described below based on embodiments with reference to the drawings. These embodiments do not limit the disclosure and are examples. The same or equivalent constituent elements, members, and processes shown in the drawings will be denoted by the same reference signs while an overlapping description thereof will be omitted as appropriate.

Figure 1:
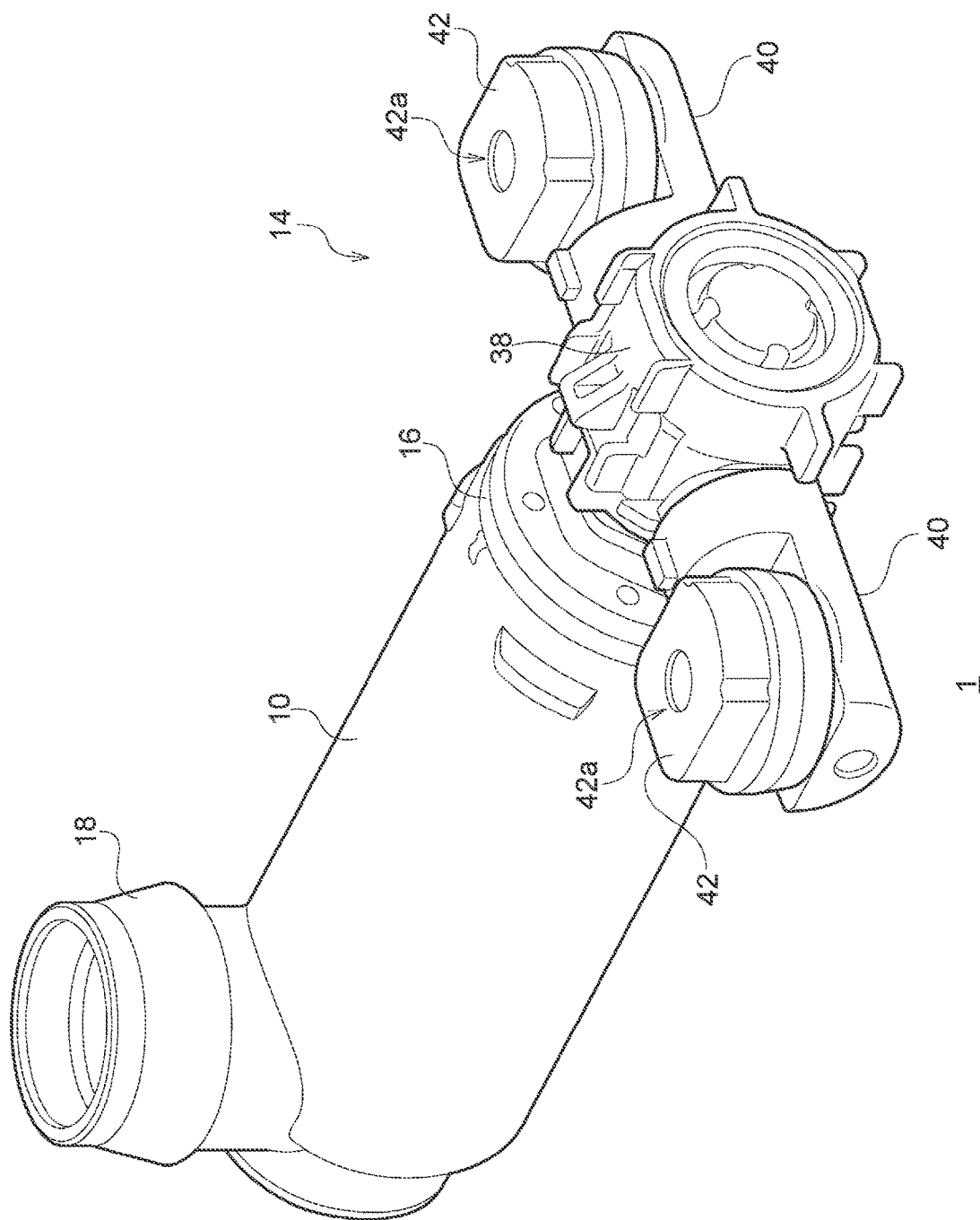
FIG. 1 is a perspective view of a vehicle cleaning device according to a first embodiment.
Figure 2:
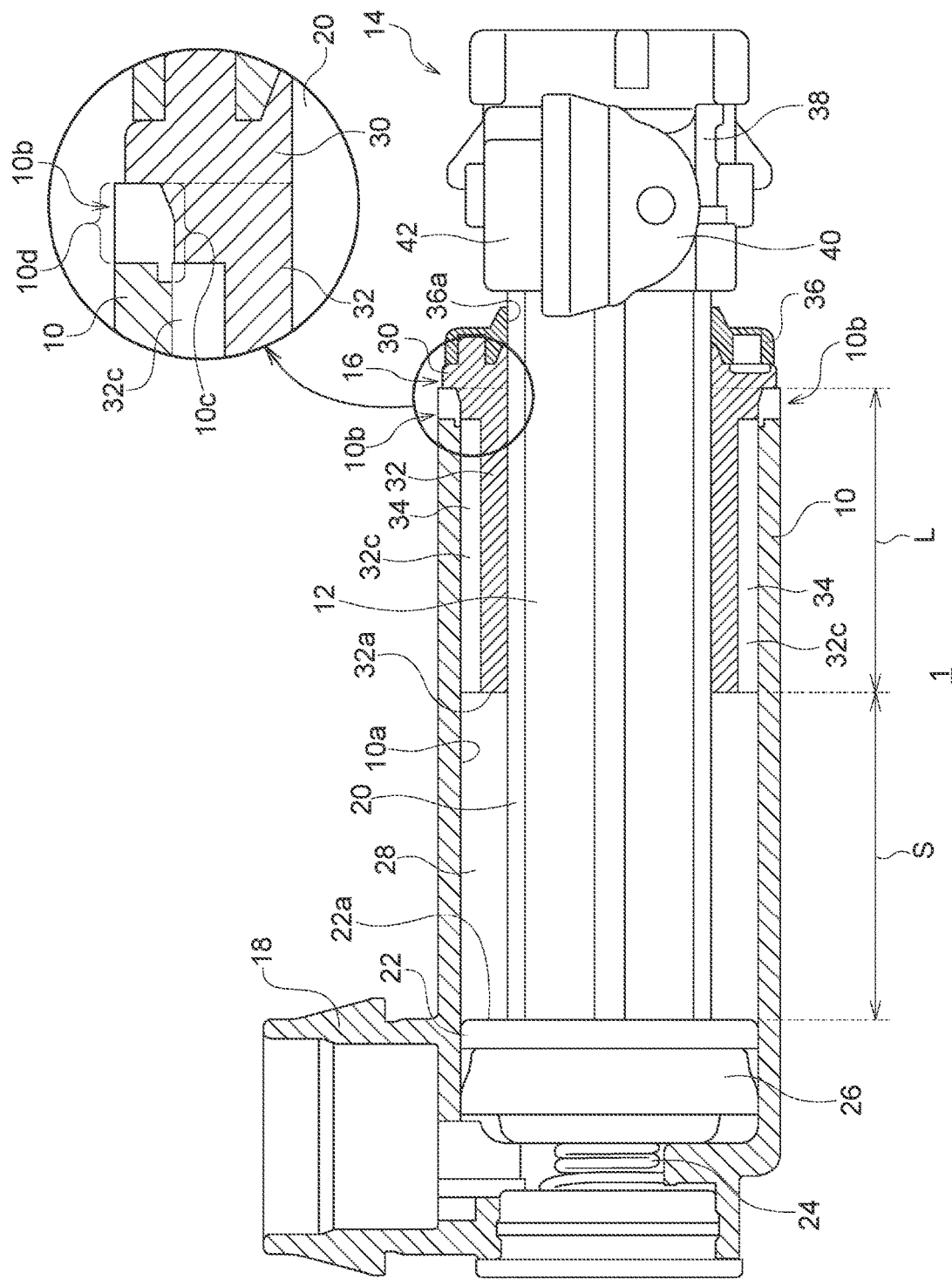
FIG. 2 is a side view of the vehicle cleaning device according to the first embodiment.
Figure 3:
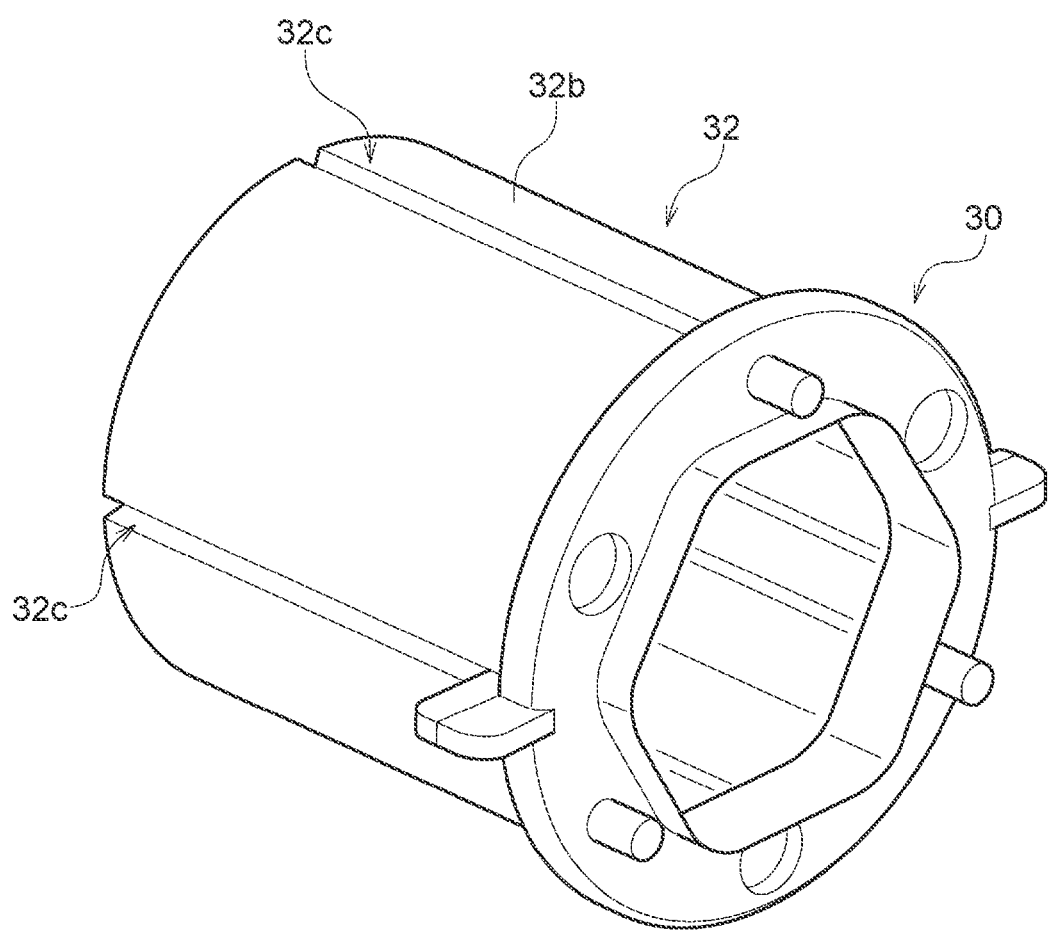
FIG. 3 is a perspective view of a cap of FIG. 1.

FIG. 1 and FIG. 2 are views showing a vehicle cleaning device 1 according to a first embodiment. FIG. 1 is a perspective view of the vehicle cleaning device 1 and FIG. 2 is a side view of the vehicle cleaning device 1. In FIG. 2, a cylinder 10 and a cap 16 are shown in section. FIG. 3 is a perspective view of the cap 16 of FIG. 1.

The vehicle cleaning device 1 includes the cylinder 10; a piston 12 that is slidably inserted in the cylinder 10; a spray nozzle unit 14 that is mounted at a leading end of the piston 12 and sprays a cleaning fluid (e.g., a cleaning liquid) toward an object-to-be-cleaned; and the cap 16 that closes a gap between the cylinder 10 and the piston 12 in an opening of the cylinder 10 through which the piston 12 protrudes.

The vehicle cleaning device 1 is housed inside a vehicle body or behind a bumper. When cleaning is performed, the spray nozzle unit 14 is protruded from the vehicle body or the bumper to an outside and the fluid is sprayed from the spray nozzle unit 14 to clean the object-to-be-cleaned. The object-to-be-cleaned may be, for example, a casing cover that contains at least one of a lighting unit (a lamp unit), a camera, and a sensor (e.g., an LiDAR), or may be, for example, the vehicle body, a window, or a mirror.

In the following description, a direction in which the cylinder 10 and the piston 12 extend will be referred to as an axial direction; a direction that passes through central axes of the cylinder 10 and the piston 12 and is perpendicular to these central axes will be referred to as a radial direction; and a side in the axial direction where the spray nozzle unit 14 is provided relatively to the piston 12 will be referred to as a front side. The axial direction corresponds to a direction in which the piston 12 and the spray nozzle unit 14 move. However, these designations do not limit the posture in which the vehicle cleaning device 1 is used, and the vehicle cleaning device 1 can be used in any posture.

The cylinder 10 is formed in a cylindrical shape. A tube (not shown) is coupled to a rear end part of the cylinder 10 through a coupling part 18. The tube is coupled to a cleaning fluid storage tank (not shown) disposed inside the vehicle body. A cleaning fluid delivered from the cleaning fluid storage tank flows into the cylinder 10.

The piston 12 includes a cylindrical tubular part 20 and a flange 22 that projects radially outward from the tubular part 20 at a position close to a rear end of the tubular part 20. Inside the tubular part 20, a spring 24, for example, a helical extension spring (i.e., a tension coil spring) is disposed, and a front end part of the spring 24 is fixed to the tubular part 20 and a rear end part of the spring 24 is fixed to the cylinder 10. Thus, the piston 12 is urged by the spring 24 toward a rear side with respect to the cylinder 10.

When the vehicle cleaning device 1 is not cleaning, the piston 12 is held at a rear end of movement (i.e., at the position in FIG. 1 and FIG. 2) by an urging force of the spring 24. The position of the piston 12 in this state is also referred to as a retracted position. Also when the piston 12 is in the retracted position, a front end of the tubular part 20 protrudes toward a front side through an opening at a front end of the cylinder 10, i.e., the front end of the tubular part 20 is located outside the cylinder 10. The cleaning fluid having flowed into the cylinder 10 flows into the tubular part 20.

An annular seal body 26 is mounted on the rear side of the flange 22. The seal body 26 is made of an elastically deformable material, such as a rubber material. The seal body 26 is fitted around the tubular part 20. The outside diameter of the seal body 26 is slightly larger than the inside diameter of the cylinder 10, and an outer periphery of the seal body 26 closely contacts an inner peripheral surface 10a of the cylinder 10. Thus, when the cleaning fluid is supplied to the cylinder 10, the cleaning fluid is prevented from flowing into a radial gap 28 between the tubular part 20 and the piston 12 at a position forward of the seal body 26.

The cap 16 includes an annular part 30 and a tubular part 32 that extends from the annular part 30 toward the rear side. The annular part 30 is fitted around the tubular part 20 of the piston 12. The outside diameter of the annular part 30 is larger than the inside diameter of the cylinder 10. The cap 16 is mounted such that the annular part 30 contacts the front end of the cylinder 10 to close a gap between the cylinder 10 and the piston 12 in the opening of the cylinder 10.

The tubular part 32 of the cap 16 is located inside the cylinder 10 so as to surround the tubular part 20 of the piston 12. The tubular part 32 of the cap 16 is fitted around the tubular part 20 of the piston 12. The outside diameter of the tubular part 32 of the cap 16 is equal to the inside diameter of the cylinder 10.

As will be described in detail later, when the vehicle cleaning device 1 performs cleaning, the piston 12 moves toward the front side until the flange 22 contacts a rear end 32a of the tubular part 32 of the cap 16. Therefore, a distance S in the axial direction between a front end 22a of the flange 22 and the rear end 32a of the tubular part 32 at a time when the piston 12 is in the retracted position is a stroke length of the piston 12. Accordingly, a length L of the tubular part 32 in the axial direction is determined based on a design value of the stroke length of the piston 12 to be achieved. Specifically, to increase the stroke length, the length L of the tubular part 32 in the axial direction is reduced, and to reduce the stroke length, the length L of the tubular part 32 in the axial direction is increased. Thus, it is possible to produce vehicle cleaning devices having different stroke lengths of the piston 12 while using the common components other than the cap.

An air hole 10b that provides communication between an inside and an outside of the cylinder 10 is formed at a front end part of the cylinder 10. In this embodiment, an opening 10c of the air hole 10b in the inner peripheral surface 10a of the cylinder 10 is entirely located radially outward of the tubular part 32 of the cap 16.

The air hole 10b is a cutout hole in the shown example but may instead be a through-hole. The air hole 10b is formed such that the opening area of an opening 10d on an outer side, i.e., in the outer peripheral surface of the cylinder 10 is smaller than the opening area of the opening 10c on an inner side, i.e., in the inner peripheral surface of the cylinder 10. Thus, the opening 10d of the air hole 10b on the outer side is formed to be relatively small. In the shown example in which the air hole 10b is a cutout hole, the cutout portion is shallower (i.e., shorter in the axial direction) on the outer side of the cylinder 10 than on the inner side of the cylinder 10. Thus, while inflow and outflow of air through the air hole 10b is allowed, entry of dust, water, etc. through the air hole 10b is blocked.

At least one communication groove 32c is formed in an outer peripheral surface 32b of the tubular part 32 of the cap 16. The communication groove 32c is a recess extending from the rear end 32a of the tubular part 32 to a radially inner side of the air hole 10b. When a plurality of communication grooves 32c is formed, these grooves should be formed at equal intervals in a circumferential direction. While the structures of the communication grooves 32c are not particularly limited, the communication grooves 32c in the embodiment are formed so as to extend linearly in the axial direction. The cross-sectional shape of the communication groove 32c may be a U-shape, a V-shape, or other shape. In a state where the cap 16 is mounted on the cylinder 10, a communication hole 34 extending in the axial direction from the rear end 32a of the tubular part 32 is formed by the communication groove 32c and the inner peripheral surface 10a of the cylinder 10. The communication hole 34 allows the gap 28 to communicate with the air hole 10b, and accordingly, with the outside of the cylinder 10. Thus, air can flow into and out of the gap 28, which enables movement of the piston 12.

A dust cover (seal member) 36 is mounted on the front side of the cap 16. The dust cover 36 is made of an elastically deformable material, such as a rubber material. The dust cover 36 has an annular shape and an inner peripheral surface 36a thereof closely contacts an outer peripheral surface of the piston 12. Thus, entry of dust, water, etc. into the cylinder 10 is blocked, and leakage of the cleaning fluid from the cylinder 10 is blocked.

The spray nozzle unit 14 includes a valve case 38, two nozzle holders 40, and two spray nozzles 42. The valve case 38 is connected to the front end of the piston 12. A valve (not shown) is disposed inside the valve case 38. The valve is urged toward the rear side by a spring (not shown), for example, a helical compression spring (i.e., a compression coil spring). As the cleaning fluid having flowed into the piston 12 is supplied to the valve case 38, the valve is opened by the pressure of the cleaning fluid and the cleaning fluid flows into the nozzle holders 40.

The nozzle holders 40 are turnably supported on lateral sides (right and left sides) of the valve case 38. The spray nozzles 42 are supported by the nozzle holders 40. A spray port 42a through which the cleaning fluid is sprayed is formed in each spray nozzle 42.

A cover (not shown) is mounted on the front side of the spray nozzle unit 14. The cover closes an opening in the vehicle body or the bumper when the vehicle cleaning device 1 is not performing cleaning (i.e., when the piston 12 is in the retracted position).

The basic configuration of the vehicle cleaning device 1 according to the first embodiment has been described above. Next, the operation of this device will be described.

When the cleaning fluid is supplied from the cleaning fluid storage tank to the cylinder 10 through a coupling pipe, the flange 22 of the piston 12 is subjected to the pressure of the cleaning fluid and the piston 12 moves from the retracted position toward the front side while stretching the spring 24. Meanwhile, as the piston 12 (particularly the flange 22) moves toward the front side, air inside the gap 28 between the cylinder 10 and the piston 12 flows to the outside of the cylinder 10 through the air hole 10b. The spray nozzle unit 14 moves toward the front side along with the piston 12 and protrudes to the outside through the opening in the vehicle body or the bumper. When the piston 12 has moved to a front end of movement, specifically when the flange 22 of the piston 12 contacts the tubular part 32 of the cap 16, the movement of the piston 12 and the spray nozzle unit 14 toward the front side stops. When the movement of the piston 12 and the spray nozzle unit 14 toward the front side stops, the pressure of the cleaning fluid rises as the cleaning fluid is further supplied. When the pressure of the cleaning fluid acting on the valve exceeds the urging force of the spring inside the valve case 38, the valve opens to cause the cleaning fluid to flow into the nozzle holders 40, and the cleaning fluid is sprayed through the spray ports 42a of the spray nozzles 42 toward the object-to-be-cleaned.

When the supply of the cleaning fluid from the cleaning fluid storage tank stops, the pressure of the cleaning fluid acting on the valve decreases and the valve closes, so that the spraying of the cleaning fluid through the spray nozzles 42 stops. When the pressure of the cleaning fluid further decreases, the piston 12 and the spray nozzle unit 14 move toward the rear side under the urging force of the spring 24, and the piston 12 returns to the retracted position. Meanwhile, as the piston 12 (particularly the flange 22) moves toward the rear side, air flows from the outside of the cylinder 10 into the gap 28 through the air hole 10b.

Next, a manufacturing method of the vehicle cleaning device 1 according to the first embodiment will be described.

Figure 4:
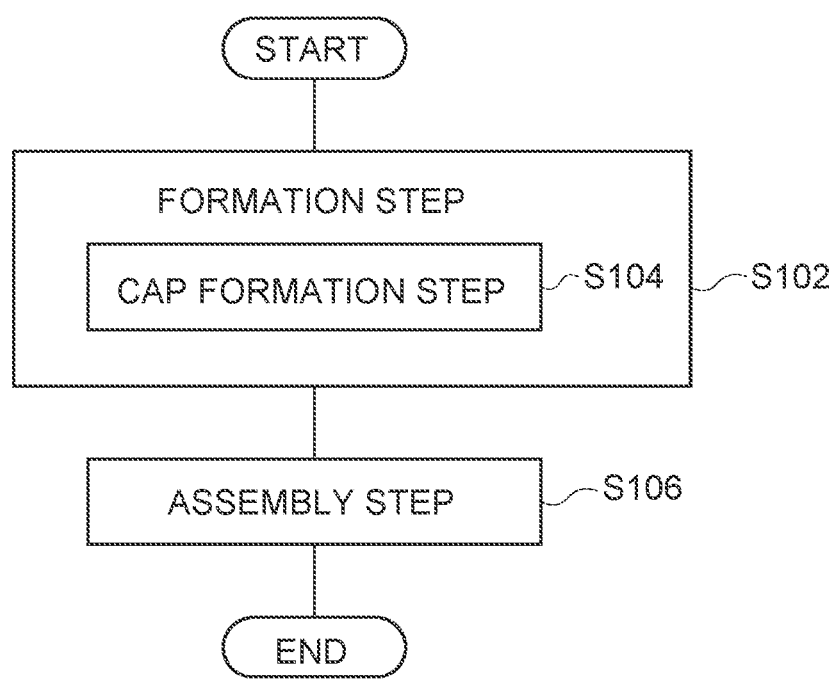
FIG. 4 is a manufacturing process chart showing a process of manufacturing the vehicle cleaning device according to the first embodiment.

FIG. 4 is a manufacturing process chart showing a process of manufacturing the vehicle cleaning device 1. The process of manufacturing the vehicle cleaning device 1 includes a formation step S102 and an assembly step S106.

In the formation step S102, members constituting the vehicle cleaning device 1 are formed. The formation step S102 includes a cap formation step S104 of forming the cap 16. In the cap formation step S104, the cap 16 in which the length L of the tubular part 32 in the axial direction is determined based on a design value of the stroke length S of the piston 12 is formed.

For example, when manufacturing N (N is an integer equal to or larger than two) kinds of vehicle cleaning devices 1 different from each other in the stroke length of the piston 12, N kinds of caps 16 different from each other in the stroke length S are formed in the cap formation step S104. The members other than the cap are formed as members common for the N kinds of vehicle cleaning devices. These members can be formed using commonly known processing technologies.

In the assembly step S106, the vehicle cleaning device 1 is assembled using the members including the cap 16.

The manufacturing process chart of FIG. 4 is merely one example and other steps may be added.

According to this embodiment, vehicle cleaning devices 1 having different stroke lengths of the piston 12 can be produced while the components other than the cap are common components (i.e., while the common components other than the cap are used). In other words, according to this embodiment, vehicle cleaning devices 1 having different stroke lengths of the piston 12 can be produced at a relatively low cost.

The disclosure has been described above based on the embodiment. As will be understood by those skilled in the art, this embodiment is an example, from which various modified examples are conceivable in terms of combinations of the constituent elements and the processes, and such modified examples are also included in the scope of the disclosure. In the following, such modified examples will be described.

Modified Example 1

In the embodiment, the case where the air hole 10b that provides communication between the communication hole 34 and the outside of the cylinder 10 is formed in the cylinder 10 has been described. However, the disclosure is not limited to this case, and the air hole may be formed in the annular part 30 of the cap 16. For example, the air hole may be formed in the annular part 30 so as to extend from the communication groove 32c.

Modified Example 2

Figure 5:
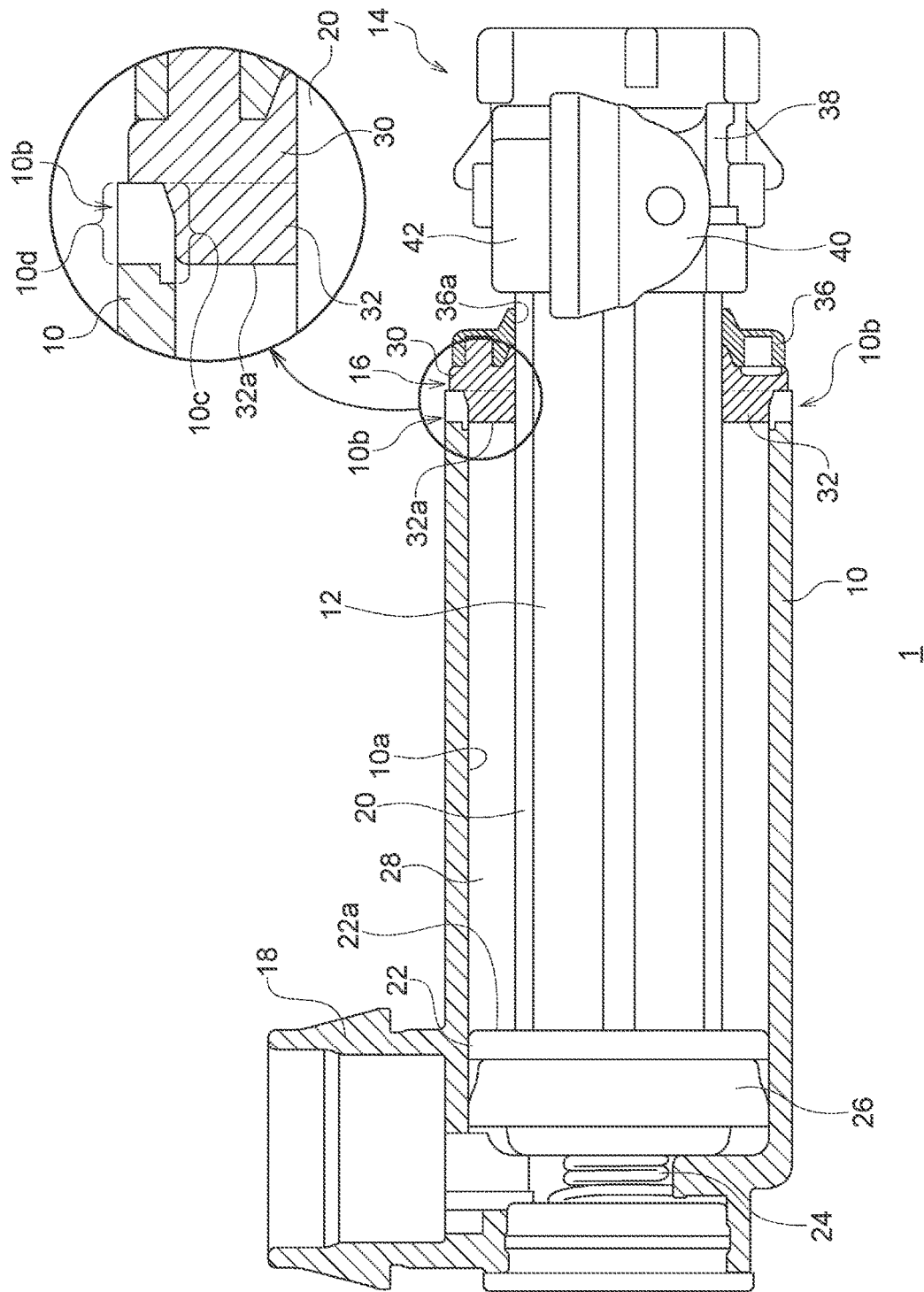
FIG. 5 is a side view of a vehicle cleaning device according to a modified example.

FIG. 5 is a side view of the vehicle cleaning device 1 according to a modified example. FIG. 5 corresponds to FIG. 2. In this modified example, the tubular part 32 of the cap 16 is formed to be relatively short in the axial direction. At least a part of the opening 10c of the air hole 10b is located rearward of the rear end 32a of the tubular part 32 of the cap 16 and faces the gap 28. In this case, the tubular part 32 may not have the communication groove 32c.

While the disclosure has been described based on the embodiment using specific words, the embodiment merely shows one aspect of the principle and application of the disclosure. Various modifications may be made to the embodiment and various changes may be made to arrangements in the embodiment within a range that does not depart from the scope of the disclosure.

Figure 7:
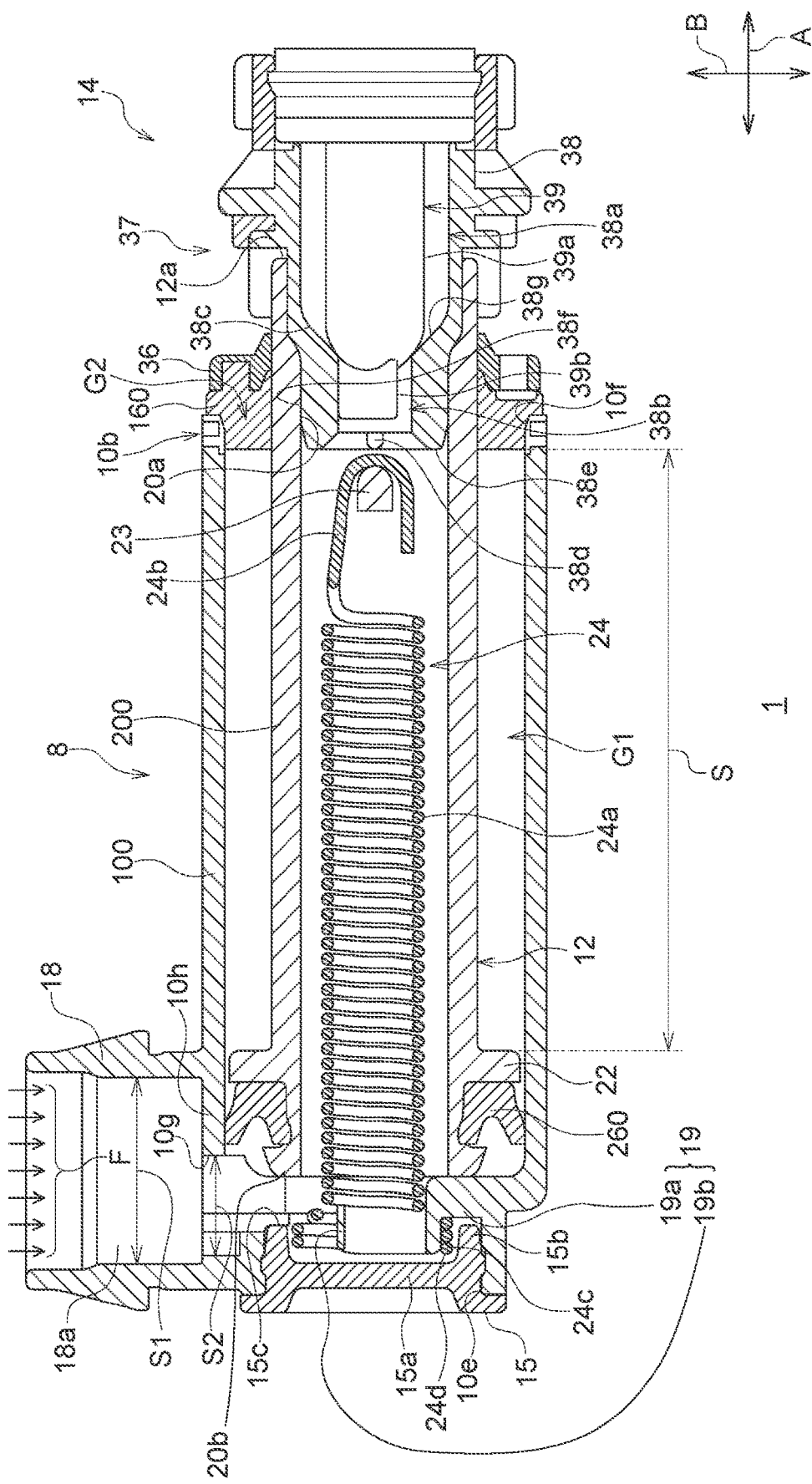
FIG. 7 is a longitudinal sectional view of the vehicle cleaning device according to the second embodiment.
Figure 8:
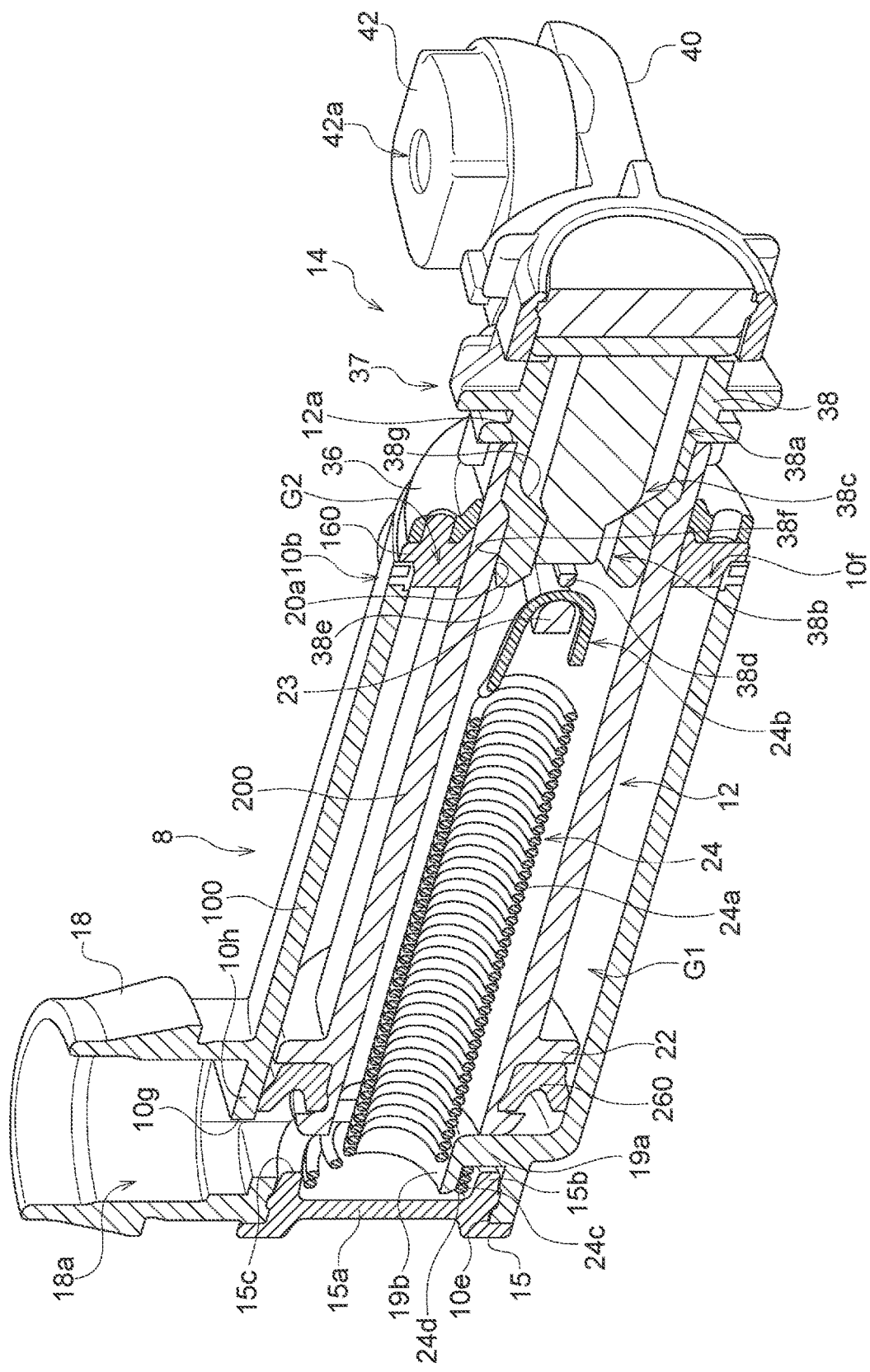
FIG. 8 is a perspective sectional view of the vehicle cleaning device according to the second embodiment.

FIG. 6 to FIG. 8 are views showing a vehicle cleaning device 1 according to a second embodiment. FIG. 6 is a perspective view of the vehicle cleaning device 1. FIG. 7 and FIG. 8 are longitudinal sectional view and a perspective sectional view of the vehicle cleaning device 1 cut along a vertical section including a central axis of a cylinder tube 100.

The vehicle cleaning device 1 includes a cylinder 8; a piston 12 that is slidably inserted in the cylinder 8; and a spray nozzle unit 14 that is mounted at a leading end (i.e., a front end of a piston tube 200) 12a of the piston 12 and sprays a cleaning fluid (e.g., a cleaning liquid) F toward an object-to-be-cleaned.

The vehicle cleaning device 1 is housed inside a vehicle body or behind a bumper. When cleaning is performed, the spray nozzle unit 14 is protruded from the vehicle body or the bumper to an outside and the cleaning fluid F is sprayed from the spray nozzle unit 14 to clean the object-to-be-cleaned. The object-to-be-cleaned may be, for example, a casing cover that contains at least one of a lighting unit (a lamp unit), a camera, and a sensor (e.g., an LiDAR), or may be, for example, the vehicle body, a window, or a mirror.

In the following description, a direction (i.e., an extension direction) in which the cylinder tube 100 of the cylinder 8 and the piston tube 200 of the piston 12 extend will be referred to as an axial direction A; a direction that passes through central axes of the cylinder tube 100 and the piston tube 200 and is perpendicular to these central axes (i.e., a direction orthogonal to the axial direction A and therefore orthogonal to the extension direction of the cylinder tube 100 and the piston tube 200) will be referred to as a radial direction B; and in the axial direction A, a side where the spray nozzle unit 14 is provided relatively to the piston tube 200 and the opposite side (i.e., the side opposite from the spray nozzle unit) will be referred to as a front side and a rear side, respectively. The axial direction A corresponds to a direction in which the piston 12 and the spray nozzle unit 14 move. These designations do not limit the posture in which the vehicle cleaning device 1 is used, and the vehicle cleaning device 1 can be used in any posture.

The cylinder 8 includes the cylinder tube 100 that is formed in a cylindrical shape, a cylindrical coupling part 18 that is coupled to an outer periphery of the cylinder tube 100 at a position close to a rear end of the cylinder tube 100, and extends vertically upward (i.e., in a direction orthogonal to the axial direction A) from the outer periphery, and a spring support 19 that is provided inside the cylinder tube 100 at a position on a rear end part. In the shown example, the coupling part 18 is joined to the rear end of the outer periphery of the cylinder tube 100.

The cylinder tube 100 is open at both ends in the axial direction A. An inflow port 10g opening to an inside of the coupling part 18 is formed in the outer periphery of the cylinder tube 100. The inflow port 10g provides communication between an inside of the cylinder tube 100 and the inside of the coupling part 18. The inflow port 10g has an opening area S2 that is smaller than a flow passage area S1 of a flow passage 18a inside the coupling part 18. The flow passage area S1 refers to the cross-sectional area in a direction orthogonal to an up-down direction that is an extension direction of the coupling part 18. The inflow port opens to the inside of the coupling part 18 at a position close to a rear side. The cylinder tube 100 has a facing surface portion 10h that faces a front side, in a width direction, of the flow passage 18a extending in the up-down direction.

A tube (not shown) is coupled to the coupling part 18. The tube is coupled to a cleaning fluid storage tank (not shown) disposed inside the vehicle body. The cleaning fluid F delivered from the cleaning fluid storage tank passes through the tube and the coupling part 18 and flows into the cylinder tube 100 through the inflow port 10g. In this embodiment, as described above, the coupling part 18 extends from the outer periphery of the cylinder tube 100 in the direction orthogonal to the axial direction A. Thus, as compared with the case where the coupling part extends from the rear end of the cylinder tube toward the rear side in the axial direction as in a vehicle cleaning device in related art, the overall length of the vehicle cleaning device 1 in the axial direction A can be reduced without the stroke length of the piston 12 being reduced.

The spring support 19 includes a spring bearing part 19a that projects radially inward from a rear end part of the cylinder tube 100 and a spring fitting part 19b that extends from a radially inner side of the spring bearing part 19a toward the rear side in the axial direction. The spring bearing part 19a has a semicircular arc shape as seen in the axial direction A. The spring fitting part 19b has a substantially semicylindrical shape.

The piston 12 includes the cylindrical piston tube 200, an annular flange 22 that projects radially outward from the piston tube 200 at a position on a rear end part of the piston tube 200, and a spring hook 23 that protrudes toward an inside of the piston tube 200 at a position on a front end part of the piston tube 200. The piston tube 200 is slidably inserted in the cylinder tube 100. The piston tube 200 is open at both ends in the axial direction A. The piston tube 200 is a cornered tube with a polygonal (hexagonal in the embodiment) cross-section but may instead be a cylinder with a circular cross-section.

A spring 24 is housed inside the piston tube 200. The spring 24 is a helical extension spring (i.e., a tension coil spring). The spring 24 includes a main body 24a that is wound to a constant diameter, a catching part 24b that is formed in a hook shape on a front end part of the main body 24a, and an annular engaging part 24c that is formed on a rear end part of the main body 24a and wound to a larger diameter than the main body 24a is.

The spring 24 is inserted in the piston tube 200 from the rear side through an opening 10e at the rear end of the cylinder tube 100. The catching part 24b is engaged with the spring hook 23 of the piston 12 by being hung on the spring hook 23. The annular engaging part 24c is fitted around the spring fitting part 19b of the spring support 19 of the cylinder 8 and rests on the spring bearing part 19a. Thus, a front end part of the spring 24 is fixed to the piston 12 and a rear end part of the spring 24 is fixed to the cylinder 8. Therefore, the piston 12 is urged by the spring 24 toward the rear side in the axial direction with respect to the cylinder 8, i.e., the piston 12 is urged by the spring 24 in a direction in which the piston 12 is retracted in the cylinder tube 100.

The opening 10e at the rear end of the cylinder tube 100 is closed by a first cap 15. The first cap 15 includes a disc part 15a and an annular protrusion 15b that protrudes from a front surface of the disc part 15a toward the front side in the axial direction. The annular protrusion 15b surrounds the spring fitting part 19b and the annular engaging part 24c. The first cap 15 restricts movement of the annular engaging part 24c toward the rear side and prevents the annular engaging part 24c from being disengaged from the spring support 19.

When the vehicle cleaning device 1 is not performing cleaning, the piston 12 is held at a rear end of movement (the position in FIG. 6 and FIG. 7) by the urging force of the spring 24. The position of the piston 12 in this state is also referred to as a retracted position. Also when the piston 12 is in the retracted position, a front end of the piston tube 200 protrudes toward the front side in the axial direction through an opening 10f at the front end of the cylinder tube 100, i.e., is located outside the cylinder tube 100. The cleaning fluid F having flowed into the cylinder tube 100 flows into the piston tube 200.

An annular seal member 260 is mounted on the rear side of the flange 22. The seal member 260 is made of an elastically deformable material, such as a rubber material. The seal member 260 is fitted around the piston tube 200 and moves along with the piston tube 200. The outside diameter of the seal member 260 is slightly larger than the inside diameter of the cylinder tube 100, and an outer periphery of the seal member 260 closely contacts an inner peripheral surface 10a of the cylinder tube 100. Thus, when the cleaning fluid F is supplied to the cylinder tube 100, the cleaning fluid F is prevented from flowing into a gap G1 in the radial direction B between the cylinder tube 100 and the piston tube 200 at a position forward of the seal member 260.

A gap G2 between the cylinder tube 100 and the piston tube 200 in the opening 10f at the front end of the cylinder tube 100 is closed with a second cap 160. The second cap 160 includes an annular part 30 and a tubular part 32 that extends from the annular part 30 toward the rear side in the axial direction, as well as the cap 16 in the first embodiment shown in FIG. 2 and FIG. 5 (see also FIG. 2 and FIG. 5). The second cap 160 in the second embodiment corresponds to the cap 16 in the first embodiment. The annular part 30 is fitted around the piston tube 200. The outside diameter of the annular part 30 is larger than the inside diameter of the cylinder tube 100. The second cap 160 is mounted such that the annular part 30 contacts the front end of the cylinder tube 100 to close the gap G2 between the cylinder tube 100 and the piston tube 200 in the opening of the cylinder tube 100.

The tubular part 32 of the second cap 160 is located inside the cylinder tube 100 so as to surround the piston tube 200. The tubular part 32 of the second cap 160 is fitted around the piston tube 200. The outside diameter of the tubular part 32 of the second cap 160 is equal to the inside diameter of the cylinder tube 100. When the vehicle cleaning device 1 performs cleaning, the piston 12 moves toward the front side in the axial direction until the flange 22 contacts the rear end 32a of the tubular part 32 of the second cap 160.

An air hole 10b that allows the gap G1 between the cylinder tube 100 and the piston tube 200 to communicate with the outside of the cylinder tube 100 is formed on the front end part of the cylinder tube 100. The air hole 10b is a cutout hole in the example shown in FIG. 2 and FIG. 5, but may instead be a through-hole. By providing the air hole 10b, air can flow into and flow out of the gap G1, which enables movement of the piston 12.

A seal member 36 is mounted on the front side of the second cap 160. The seal member 36 is made of an elastically deformable material, such as a rubber material. The seal member 36 in the second embodiment is formed in an annular shape, and an inner peripheral surface 36a thereof closely contacts an outer peripheral surface of the piston tube 200, as well as the seal member (dust cover) 36 in the first embodiment shown in FIG. 2 and FIG. 5 (see also FIG. 2 and FIG. 5). Thus, a gap between the second cap 160 and the piston tube 200 is sealed, so that entry of dust, water, etc. into the cylinder tube 100 is blocked, and leakage of the cleaning fluid F from the cylinder tube 100 is blocked.

When the piston 12 is in the retracted position and the coupling part 18 is seen in the radial direction B, a rear end 20b of the piston tube 200 overlaps the flow passage 18a of the cleaning fluid F inside the coupling part 18. In the shown example, the rear end 20b of the piston tube 200 also overlaps the inflow port 10g. Thus, when the piston 12 is in the retracted position, the rear end 20b of the piston tube 200 is located inward of the flow passage 18a in the radial direction B, and further, in the shown example, located inward of the inflow port 10g in the radial direction B. In this case, the length in the axial direction A of a portion of the piston tube 200 that protrudes from the cylinder tube 100 at a time when the piston 12 is in the retracted position is reduced, and therefore the overall length of the vehicle cleaning device 1 in the axial direction A at a time when the piston 12 is in the retracted position can be reduced.

Further, when the piston 12 is in the retracted position and the coupling part 18 is seen in the radial direction B, the seal member 260 overlaps the facing surface portion 10h, and accordingly, overlaps the flow passage 18a. In other words, when the piston 12 is in the retracted position, the seal member 260 is located inward of the facing surface portion 10h, and accordingly, inward of the flow passage 18a in the radial direction B. In this case, the flange 22 can be provided so as to be located at a relatively rearward position when the piston 12 is in the retracted position. Thus, the distance S in the axial direction A between the front end 22a of the flange 22 and the rear end 32a of the tubular part 32 at the time when the piston 12 is in the retracted position, i.e., the stroke length of the piston 12 can be increased (see also FIG. 2 and FIG. 5). If the facing surface portion 10h is extended farther toward the rear side in the axial direction, the position of the seal member 260 can be located at a more rearward position in the axial direction. However, when the facing surface portion 10h is extended farther toward the rear side in the axial direction, the opening area S2 of the inflow port 10g decreases accordingly. Therefore, the opening area S2 of the inflow port 10g, accordingly, the length of the facing surface portion 10h in the axial direction should be determined such that a desired inflow rate can be achieved.

When the coupling part 18 is seen in the radial direction B, the annular engaging part 24c of the spring 24 overlaps the flow passage 18a of the coupling part 18. In other words, the annular engaging part 24c is located inward of the flow passage 18a in the radial direction B. In the shown example, a rear end 24d of the annular engaging part 24c is located rearward of the inflow port 10g in the axial direction. The annular protrusion 15b of the first cap 15 surrounding the spring fitting part 19b and the annular engaging part 24c is located inward of the flow passage 18a of the coupling part 18 in the radial direction B. A front end 15c of the annular protrusion 15b is located inward of the inflow port 10g in the radial direction B. In these cases, the annular engaging part 24c of the spring 24 inserted through the opening 10e at the rear end of the cylinder tube 100 is fixed to the cylinder tube 100 at a position closer to the rear end of the cylinder tube 100, and therefore the annular engaging part 24c can be fixed relatively easily.

The spray nozzle unit 14 includes a valve 37 that controls the flow of the cleaning fluid from the piston tube 200 to the spray nozzle unit 14, two nozzle holders 40, and two spray nozzles 42. The valve 37 includes a valve case 38 and a valve element 39. The valve case 38 is formed in a tubular shape. A rear end part of the valve case 38 is press-fitted into a front end part of the piston tube 200. Specifically, an outer periphery 38f of the rear end part of the valve case 38 is fitted onto an inner periphery 20a of the front end part of the piston tube 200 such that a rear end 38e of the valve case 38 is located inside the piston tube 200. In the shown example, when the piston 12 is in the retracted position, the rear end 38e of the valve case 38 reaches the radially inner side of the cylinder tube 100. Therefore, when seen in the radial direction B, the rear end part of the valve case 38 overlaps the second cap 160 and the seal member 36.

Inside the valve case 38, a valve chamber 38a and a valve hole 38b are formed. The valve hole 38b has a smaller diameter than that of the valve chamber 38a, and is provided rearward of the valve chamber 38a in the axial direction so as to be continuous with the valve chamber 38a. A rear end part of an inner wall of the valve chamber 38a is tapered, and a rear end of a tapered surface 38g constitutes a valve seat 38c on which the valve element 39 rests. In this embodiment, the valve seat 38c is located on the radially inner side of the front end part of the piston tube 200 (i.e., the valve seat 38c is located radially inward of the front end part of the piston tube 200). Further, in the shown example, when the piston 12 is in the retracted position, the valve seat 38c is located radially inward of the seal member 36. The valve seat 38c may be located at a more rearward position in the axial direction than the position of the valve seat 38c in the shown example, and when the piston 12 is in the retracted position, the valve seat 38c may be located radially inward of the second cap 160 and may be located radially inward of the cylinder tube 100.

The valve case 38 includes a restriction portion 38d that protrudes inward at the rear end of the valve case 38. The restriction portion 38d may contact the catching part 24b of the spring 24 from the front side, or may be provided with a small gap left between the catching part 24b and the restriction portion 38d as shown in the drawings. In this embodiment, the restriction portion 38d faces the spring hook 23 in the axial direction A, though the disclosure is not limited to this configuration. The restriction portion 38d restricts the movement of the catching part 24b toward the front side in the axial direction, and thereby reduces the possibility that the catching part 24b and the spring hook 23 may be disengaged from each other, i.e., that the catching part 24b may fall off the spring hook 23.

The valve element 39 is made of, for example, an elastically deformable rubber material. The valve element 39 includes a valve main body 39a and a protrusion 39b. The valve main body 39a is disposed in the valve chamber 38a and a rear end thereof is ball-shaped. The protrusion 39b protrudes from the valve main body 39a toward the rear side in the axial direction and moves into the valve hole 38b. The valve element 39 is urged toward the rear side in the axial direction by a spring (not shown), for example, a helical compression spring (i.e., a compression coil spring). Under an urging force of this spring, the valve main body 39a rests on the valve seat 38c. Thus, the valve 37 is closed. As a result, the valve chamber 38a and the nozzle holders 40 are cut off from the valve hole 38b and the piston tube 200 (communication therebetween is blocked).

When the cleaning fluid F having flowed into the piston tube 200 is supplied to the valve hole 38b and the pressure of the cleaning fluid F acting on the valve element 39 exceeds the urging force of the spring that urges the valve element 39, the valve element 39 moves away from the valve seat 38c against the urging force of the spring. Thus, the valve 37 is opened. As a result, the valve chamber 38a and the nozzle holders 40 communicate with the valve hole 38b and the piston tube 200, and thus the cleaning fluid F flows into the nozzle holders 40.

The nozzle holders 40 are turnably supported on lateral sides (right and left sides) of the valve case 38. The nozzle holders 40 respectively support the spray nozzles 42. The cleaning fluid F having flowed into the nozzle holders 40 is sprayed through spray ports 42a of the spray nozzles 42.

A cover (not shown) is mounted on the front side of the spray nozzle unit 14. The cover closes the opening in the vehicle body or the bumper when the vehicle cleaning device 1 is not performing cleaning (i.e., when the piston 12 is in the retracted position).

The basic configuration of the vehicle cleaning device 1 according to the second embodiment has been described above. Next, the operation of this device will be described.

When the cleaning fluid F is supplied from the cleaning fluid storage tank to the cylinder tube 100 through the coupling part 18, the cleaning fluid F flows into the piston tube 200 and the flange 22 is subjected to the pressure of the cleaning fluid F, and thus, the piston 12 moves from the retracted position toward the front side in the axial direction while stretching the spring 24. The spray nozzle unit 14 moves toward the front side in the axial direction along with the piston 12 and protrudes to the outside through the opening in the vehicle body or the bumper. When the piston 12 has moved to the front end of movement in the axial direction, specifically when the flange 22 of the piston 12 contacts the second cap 160, the movement of the piston 12 and the spray nozzle unit 14 toward the front side in the axial direction stops. When the movement of the piston 12 and the spray nozzle unit 14 toward the front side in the axial direction stops, the pressure of the cleaning fluid F inside the piston tube 200 rises as the cleaning fluid F is further supplied. Then, the valve 37 opens to cause the cleaning fluid F to flow into the nozzle holders 40, and the cleaning fluid F is sprayed through the spray ports 42a of the spray nozzles 42 toward the object-to-be-cleaned.

When the supply of the cleaning fluid F from the cleaning fluid storage tank stops, the pressure of the cleaning fluid F acting on the valve element 39 decreases and the valve 37 closes, and thus, the cleaning fluid F stops flowing into the nozzle holders 40 and the spraying of the cleaning fluid F from the spray nozzles 42 stops. When the pressure of the cleaning fluid F further decreases, the piston 12 and the spray nozzle unit 14 move toward the rear side in the axial direction under the urging force of the spring 24, and the piston 12 returns to the retracted position.

Next, an assembly method of the vehicle cleaning device 1 according to the second embodiment will be described.

Portions (a) to (d) in FIG. 9 are views showing an assembly procedure of the vehicle cleaning device 1. As shown in the portion (a) of FIG. 9, the piston 12 is inserted in the cylinder tube 100 through the opening 10f at the front end of the cylinder tube 100.

As shown in the portion (b) of FIG. 9, the spring 24 is inserted in the piston tube 200 inside the cylinder tube 100 through the opening 10e at the rear end of the cylinder tube 100. The catching part 24b of the spring 24 is engaged with the spring hook 23 (not shown in FIG. 9) of the piston 12, and the annular engaging part 24c is engaged with the spring support 19 (not shown in FIG. 9) of the cylinder 8. Thus, the spring 24 is inserted in the piston tube 200, and the front end of the spring 24 is fixed to the piston 12 and the rear end of the spring 24 is fixed to the cylinder 8.

As shown in the portion (c) of FIG. 9, the first cap 15 is mounted at the rear end of the cylinder tube 100 to close the opening 10e at the rear end of the cylinder tube 100. The second cap 160 and the seal member 36 are mounted at the front end of the cylinder tube 100 to close the opening 10f at the front end of the cylinder tube 100.

As shown in the portion (d) of FIG. 9, the spray nozzle unit 14 is mounted on the front end part of the piston 12. Specifically, the rear end part of the valve case 38 of the spray nozzle unit 14 is press-fitted onto the inner periphery of the piston tube 200.

Next, effects produced by the embodiment will be described.

FIG. 10A and FIG. 10B are views for describing the effects of the vehicle cleaning device 1 according to the embodiment. FIG. 10A is a sectional view of the vehicle cleaning device 1 according to the embodiment, and FIG. 10B is a sectional view of a vehicle cleaning device 101 according to a comparative example.

In the vehicle cleaning device 101 according to the comparative example, an inner periphery of a rear end part of a valve case 138 of a valve 137 is fitted on an outer side of a front end part of a piston tube 200. In this case, a border 140 between the piston tube 200 and the valve case 138 is exposed in an outer periphery of the piston tube 200. The piston tube 200 is configured such that a seal member 36 does not cross this border.

In the vehicle cleaning device 1 according to the embodiment, in contrast, the outer periphery of the rear end part of the valve case 38 is fitted on the inner periphery of the front end part of the piston tube 200. Thus, a border between the piston tube 200 and the valve case 38 is not exposed in the outer periphery of the piston tube 200, unlike the border in the comparative example. Therefore, the piston tube 200 can be retracted into the cylinder tube 100 up to a position where the seal member 36 is located near the front end of the piston tube 200. This means that the overall length of the vehicle cleaning device 1 in the axial direction A at the time when the piston 12 is in the retracted position can be reduced while the stroke length of the piston 12 equivalent to that of the comparative example is maintained.

In the vehicle cleaning device 101 according to the comparative example, a valve seat 138c is located outside the piston tube 200 (i.e., the valve seat 138c is located forward of the piston tube 200 in the axial direction). In this case, the length of a portion of the spray nozzle unit 14 that protrudes from the piston tube 200 toward the front side in the axial direction is long, and accordingly the overall length of the vehicle cleaning device 1 in the axial direction A at the time when the piston 12 is in the retracted position is long.

In the vehicle cleaning device 1 according to the embodiment, in contrast, the valve seat 38c is located inside the piston tube 200. The valve seat 38c may be located radially inward of the seal member 36 or located rearward of the seal member 36 in the axial direction when the piston 12 is in the retracted position. Thus, the valve seat 38c may be located radially inward of the seal member 36, the second cap 160, or the cylinder tube 100. In these cases, the length of a portion of the spray nozzle unit 14 that protrudes toward the front side from the piston tube 200 is reduced as compared with that in the comparative example. It is therefore possible to reduce the overall length of the vehicle cleaning device 1 in the axial direction A at the time when the piston 12 is in the retracted position, while maintaining the stroke length of the piston 12 that is equivalent to that of the comparative example.

In the vehicle cleaning device 1 according to the embodiment, when the piston 12 is in the retracted position, the rear end 20b of the piston tube 200 is located radially inward of the flow passage 18a of the coupling part 18 in the radial direction B. The rear end 20b of the piston tube 200 may be located inward of the inflow port 10g in the radial direction B. In these cases, the length of a portion of the piston tube 200 that protrudes from the cylinder tube 100 in the axial direction A at the time when the piston 12 is in the retracted position is reduced, and therefore the overall length of the vehicle cleaning device 1 in the axial direction A at the time when the piston 12 is in the retracted position can be reduced.

In the vehicle cleaning device 1 according to the embodiment, when the piston 12 is in the retracted position, the seal member 260 is located inward of the flow passage 18a of the coupling part 18 in the radial direction B. In this case, the flange 22 can be provided so as to be located at a relatively rearward position when the piston 12 is in the retracted position, which can increase the stroke length of the piston 12.

In the vehicle cleaning device 1 according to the embodiment, when the coupling part 18 is seen in the radial direction B, the annular engaging part 24c of the spring 24 is located inward of the flow passage 18a in the radial direction B. The rear end 24d of the annular engaging part 24c may be located rearward of the inflow port 10g in the axial direction. In these cases, the annular engaging part 24c of the spring 24 inserted through the opening 10e at the rear end of the cylinder tube 100 is fixed to the cylinder tube 100 at a position closer to the rear end of the cylinder tube 100, and therefore the annular engaging part 24c can be fixed relatively easily.

The disclosure has been described above based on the embodiment. As will be understood by those skilled in the art, this embodiment is an example, from which various modified examples are conceivable in terms of combinations of the constituent elements and the processes, and such modified examples are also included in the scope of the disclosure.

What is claimed is:

1. A vehicle cleaning device comprising:
    a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body;
    a piston including a piston tube that is open at both ends, the piston tube being slidably inserted in the cylinder tube, the piston tube receiving the cleaning fluid; and
    a spray nozzle unit that is mounted at a leading end, in an extension direction, of the piston tube protruding from the cylinder tube, the spray nozzle unit being configured to spray the cleaning fluid supplied from an inside of the piston tube toward an object-to-be-cleaned, wherein:
    the coupling part is joined to the outer periphery of the cylinder tube at a position on a side opposite from the spray nozzle unit; and
    when the piston is in a retracted position and the coupling part is seen in a direction orthogonal to the extension direction, the piston tube and a flow passage for the cleaning fluid inside the coupling part overlap each other;
    the piston includes a flange that projects outward from the piston tube at a position on the side opposite from the spray nozzle unit;
    the vehicle cleaning device includes a seal member that is fitted within the cylinder tube and around the piston tube at a position farther from the spray nozzle unit than the flange is;
    the seal member provides sealing such that the cleaning fluid does not flow into a radial gap between the cylinder tube and the piston tube at a position closer to the spray nozzle unit than the seal member is;
    when the piston is in the retracted position and the coupling part is seen in the direction orthogonal to the extension direction, the seal member and the flow passage inside the coupling part overlap each other
    the entire seal member is disposed at a position that is closer to the spray nozzle unit than the inflow port is to the spray nozzle unit, and the seal member overlaps a flow passage inside the coupling part; and
    the cylinder tube has a portion extending partially inwardly into the flow passage, such that the piston tube, the seal member, and the flow passage all overlap when viewed in the orthogonal direction.

2. The vehicle cleaning device according to claim 1, wherein, when the piston is in the retracted position and the coupling part is seen in the direction orthogonal to the extension direction, the piston tube and the inflow port overlap each other.

3. The vehicle cleaning device according to claim 1, further comprising
    a spring that is housed inside the piston tube and urges the piston toward the side opposite from the spray nozzle unit, wherein:
    the cylinder tube has, at an end on the side opposite from the spray nozzle unit, an opening through which the spring is inserted during assembly of the vehicle cleaning device, and the opening is closed with a cap;

an end of the spring on the side of the spray nozzle unit is fixed to the piston tube, and a part of the spring on the side opposite from the spray nozzle unit is fixed to the cylinder tube; and the part of the spring on the side opposite from the spray nozzle unit is at least partially located farther from the spray nozzle unit than the inflow port is.

4. The vehicle cleaning device according to claim 3, wherein:

the spring includes a main body, a hook-shaped catching part that is provided on the main body at a position on the side of the spray nozzle unit, and an annular engaging part that is provided on the main body at a position on the side opposite from the spray nozzle unit, the annular engaging part being wound to a larger diameter than the main body is;

the hook-shaped catching part is engaged with a spring hook provided inside the piston tube by being hung on the spring hook;

the annular engaging part is engaged with a spring support provided inside the cylinder tube by being fitted around the spring support; and an end of the annular engaging part on the side opposite from the spray nozzle unit is located farther from the spray nozzle unit than the inflow port is.

5. A vehicle cleaning device comprising:

a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body;

a piston including a piston tube that is open at both ends, the piston being slidably inserted in the cylinder tube, the piston tube receiving the cleaning fluid;

a spray nozzle unit that is mounted at a leading end, in an extension direction, of the piston tube protruding from the cylinder tube, the spray nozzle unit being configured to spray the cleaning fluid supplied from through an inside of the piston tube toward an object-to-be-cleaned; and a spring that is housed inside the piston tube and urges the piston toward a side opposite from the spray nozzle unit, wherein:

the coupling part is joined to the outer periphery of the cylinder tube at a position on the side opposite from the spray nozzle unit;

the cylinder tube has, at an end on the side opposite from the spray nozzle unit, an opening through which the spring is inserted during assembly of the vehicle cleaning device, and the opening is closed with a cap; and an end of the spring on the side opposite from the spray nozzle unit is located farther from the spray nozzle unit than the inflow port is;

the piston includes a flange that projects outward from the piston tube at a position on the side opposite from the spray nozzle unit;

the vehicle cleaning device includes a seal member that is fitted within the cylinder tube and around the piston tube at a position farther from the spray nozzle unit than the flange is;

the seal member provides sealing such that the cleaning fluid does not flow into a radial gap between the cylinder tube and the piston tube at a position closer to the spray nozzle unit than the seal member is;

when the piston is in the retracted position and the coupling part is seen in a direction orthogonal to the extension direction, the seal member and the flow passage inside the coupling part overlap each other; and the entire seal member is disposed at a position that is closer to the spray nozzle unit than the inflow port is to the spray nozzle unit, and the seal member overlaps a flow passage inside the coupling part; and the cylinder tube has a portion extending partially inwardly into the flow passage, such that the piston tube, the seal member, and the flow passage all overlap when viewed in the orthogonal direction.

6. An assembly method of a vehicle cleaning device, wherein the vehicle cleaning device comprises:

a cylinder to which a cleaning fluid is supplied, the cylinder including a cylinder tube and a coupling part joined to an outer periphery of the cylinder tube, the coupling part communicating with the cylinder tube through an inflow port provided in the outer periphery, and the coupling part being coupled through a tube to a cleaning fluid storage tank provided inside a vehicle body;

a piston including a piston tube that is open at both ends, the piston being slidably inserted in the cylinder tube, the piston tube receiving the cleaning fluid;

a spray nozzle unit that is mounted at a leading end, in an extension direction, of the piston tube protruding from the cylinder tube, the spray nozzle unit being configured to spray the cleaning fluid supplied from through an inside of the piston tube toward an object-to-be-cleaned; and a spring that is housed inside the piston tube and urges the piston toward a side opposite from the spray nozzle unit, wherein:

the coupling part is joined to the outer periphery of the cylinder tube at a position on the side opposite from the spray nozzle unit;

the cylinder tube has, at an end on the side opposite from the spray nozzle unit, an opening through which the spring is inserted during assembly of the vehicle cleaning device, and the opening is closed with a cap; and an end of the spring on the side opposite from the spray nozzle unit is located farther from the spray nozzle unit than the inflow port is;

the piston includes a flange that projects outward from the piston tube at a position on the side opposite from the spray nozzle unit;

the vehicle cleaning device includes a seal member that is fitted within the cylinder tube and around the piston tube at a position farther from the spray nozzle unit than the flange is;

the seal member provides sealing such that the cleaning fluid does not flow into a radial gap between the cylinder tube and the piston tube at a position closer to the spray nozzle unit than the seal member is;

when the piston is in the retracted position and the coupling part is seen in a direction orthogonal to the extension direction, the seal member and the flow passage inside the coupling part overlap each other; and the entire seal member is disposed at a position that is closer to the spray nozzle unit than the inflow port is to the spray nozzle unit, and the seal member overlaps a flow passage inside the coupling part; and the cylinder tube has a portion extending partially inwardly into the flow passage, such that the piston tube, the seal member, and the flow passage all overlap when viewed in the orthogonal direction, the assembly method comprising the steps of:
insering the spring into the piston tube inside the cylinder tube through the opening provided at the end of the cylinder tube on the side opposite from the spray nozzle unit, fixing a part of the spring on a side of the spray nozzle unit to the piston tube, and fixing a part of the spring on the side opposite from the spray nozzle unit to the cylinder tube such that the end of the spring on the side opposite from the spray nozzle unit is located farther from the spray nozzle unit than the inflow port is; and
closing the opening with the cap.

* * * * *